United States Patent
Uhm et al.

(10) Patent No.: US 11,646,426 B2
(45) Date of Patent: May 9, 2023

(54) ELECTRODE HAVING THREE DIMENSIONAL STRUCTURE AND ELECTROCHEMICAL DEVICE INCLUDING THE SAME

(71) Applicants: LG Chem, Ltd., Seoul (KR); Ulsan National Institute of Science and Technology, Ulsan (KR)

(72) Inventors: In-Sung Uhm, Daejeon (KR); Sang-Young Lee, Ulsan (KR); Sung-Joong Kang, Daejeon (KR); Jeong-A Kim, Ulsan (KR); Je-Young Kim, Daejeon (KR); Ju-Myung Kim, Ulsan (KR); Yong-Hee Lee, Daejeon (KR); Jae-Hyun Lee, Daejeon (KR)

(73) Assignees: Ulsan National Institute of Science and Technology; LG Energy Solution, Ltd.

( * ) Notice: Subject to any disclaimer, the term of this patent is extended or adjusted under 35 U.S.C. 154(b) by 445 days.

(21) Appl. No.: 16/641,057

(22) PCT Filed: Nov. 8, 2018

(86) PCT No.: PCT/KR2018/013580
§ 371 (c)(1),
(2) Date: Feb. 21, 2020

(87) PCT Pub. No.: WO2019/093800
PCT Pub. Date: May 16, 2019

(65) Prior Publication Data
US 2021/0050600 A1 Feb. 18, 2021

(30) Foreign Application Priority Data
Nov. 8, 2017 (KR) .................. 10-2017-0148354

(51) Int. Cl.
*H01M 4/80* (2006.01)
*H01G 11/28* (2013.01)
(Continued)

(52) U.S. Cl.
CPC ............ *H01M 4/806* (2013.01); *H01G 11/28* (2013.01); *H01G 11/30* (2013.01); *H01G 11/52* (2013.01);
(Continued)

(58) Field of Classification Search
CPC .......... H01M 4/13; H01M 4/62; H01M 4/622
See application file for complete search history.

(56) References Cited

U.S. PATENT DOCUMENTS

| 2011/0318642 A1 | 12/2011 | Nishiyama et al. |
| 2013/0029330 A1 | 1/2013 | Shawar et al. |

(Continued)

FOREIGN PATENT DOCUMENTS

| CN | 102593436 A | 7/2012 |
| CN | 103730630 A | 4/2014 |

(Continued)

OTHER PUBLICATIONS

Machine translation of KR 2016-0043769 (no date).*

(Continued)

*Primary Examiner* — Amanda C. Walke
(74) *Attorney, Agent, or Firm* — Lerner David LLP

(57) ABSTRACT

Disclosed are an electrode having a three-dimensional structure, the electrode including: a porous nonwoven web including a plurality of polymer fibers that form an interconnected porous network; an active material composite positioned among the polymer fibers and including active material particles and a first conductive material; and a second conductive material positioned on an outer surface of the active material composite, wherein the interconnected (Continued)

porous network is filled homogeneously with the active material composite and the second conductive material to form a super lattice structure, and an electrochemical device including the electrode having a three-dimensional structure.

22 Claims, 5 Drawing Sheets

(51) Int. Cl.
    *H01G 11/30* (2013.01)
    *H01G 11/52* (2013.01)
    *H01G 11/86* (2013.01)
    *H01M 4/13* (2010.01)
    *H01M 4/36* (2006.01)
    *H01M 4/66* (2006.01)
    *H01M 4/02* (2006.01)

(52) U.S. Cl.
    CPC .............. *H01G 11/86* (2013.01); *H01M 4/13* (2013.01); *H01M 4/366* (2013.01); *H01M 4/668* (2013.01); *H01M 2004/021* (2013.01); *H01M 2004/027* (2013.01)

(56) References Cited

U.S. PATENT DOCUMENTS

| 2013/0065129 | A1 | 3/2013 | Song et al. |
| 2013/0202960 | A1 | 8/2013 | Kim |
| 2016/0301096 | A1* | 10/2016 | Zhamu ................. H01G 11/24 |
| 2017/0365858 | A1 | 12/2017 | Yun et al. |
| 2018/0108941 | A1 | 4/2018 | Lee et al. |
| 2020/0335767 | A1* | 10/2020 | Archer ................. H01M 4/747 |

FOREIGN PATENT DOCUMENTS

| JP | 2000208147 A | 7/2000 |
| JP | 2010090819 A | 4/2010 |
| JP | 5400866 B2 | 1/2014 |
| KR | 101088073 B1 | 12/2011 |
| KR | 20130029330 A | 3/2013 |
| KR | 101477782 B1 | 12/2014 |
| KR | 20150050151 A | 5/2015 |
| KR | 20150064697 A | 6/2015 |
| KR | 101588313 B1 | 2/2016 |
| KR | 20160043769 A | 4/2016 |
| KR | 20160043939 A | 4/2016 |
| KR | 20180072472 A * | 4/2016 |
| KR | 20160062617 A | 6/2016 |
| KR | 101761524 B1 | 7/2017 |
| WO | 2016182100 A1 | 11/2016 |

OTHER PUBLICATIONS

Machine translation of KR 2016-0043939 (no date).*
Machine translation of KR 2016-0062617 (no date).*
Machine translation of KR 2018-0072473 )no date).*
Extended European Search Report with Written Opinion for Application No. 18876901.2 dated Jul. 28, 2020, 9 pages.
International Search Report for Application No. PCT/KR2018/013580 dated Feb. 19, 2019. 2 pages.

* cited by examiner

ELECTRODE HAVING THREE DIMENSIONAL STRUCTURE AND ELECTROCHEMICAL DEVICE INCLUDING THE SAME

CROSS-REFERENCE TO RELATED APPLICATIONS

The present application is a national phase entry under 35 U.S.C. § 371 of International Application No. PCT/KR2018/013580, filed on Nov. 8, 2018, which claims priority to Korean Patent Application No. 10-2017-0148354, filed on Nov. 8, 2017, the disclosures of which are hereby incorporated herein by reference.

TECHNICAL FIELD

The present disclosure relates to an electrode having a three-dimensional structure and an electrochemical device including the same.

BACKGROUND ART

Recently, IT electronic instruments, such as a smart phone, tablet personal computer (PC) and high-performance notebook PC, have been in increasingly in demand Additionally, as a part of countermeasures for global warming and resource depletion, needs for large-capacity power storage systems, such as electric vehicles and smart grids, have been increased significantly. Thus, the demand for electrochemical devices, including secondary batteries, has been increased rapidly.

Particularly, a lithium secondary battery corresponds to the most spotlighted electrochemical device by virtue of its excellent cycle life and high energy density. However, in order to meet the requirement for high output and high capacity, there is a need for providing a measure for improving an electrochemical device satisfying the requirement.

In this context, an electrode contributing to the capacity of an electrochemical device includes a metal current collector and a mixture of an active material, conductive material and a binder coated thereon. However, among the constitutional ingredients of the electrode, only the active material substantially contributes to the capacity and energy density of the electrochemical device. Therefore, many studies have been conducted about various structures and ingredients of active materials.

However, even an active material has high theoretical capacity, it shows insufficient reversible capacity due to its unique low electron and ion conductivity. In addition, an excessive amount of conductive material is used when designing an electrode to overcome the above-mentioned shortcoming. This causes a serious problem related with improvement of the energy density of a battery.

Therefore, it is possible to increase the capacity of an electrode per unit weight or volume by minimizing additives, such as a conductive material and binder, and thus to increase the energy density of an electrochemical device ultimately.

In addition, it is advantageous to use a current collector made of a light material instead of a metal current collector. In the case of a metal current collector, it occupies a large weight and volume in an electrode, and thus becomes one of the causes for degradation of the capacity of the electrode per unit weight or volume.

Further, when using an electroconductive material functioning as a conductive material, it is possible to for an electrode to have a uniform electroconductive network. This is because formation of a uniform electroconductive network inside of the active material in the electrode provides improved electroconductivity, resulting in improvement of the output characteristics of an electrochemical device.

Thus, when minimizing additives, such as a conductive material and binder, using a current collector made of a light material instead of a metal current collector, and applying an electrode having an excellent electroconductive network formed therein to an electrochemical device, it is possible to accomplish excellent characteristics, such as high capacity, high output and high energy density. However, there have been no sufficient studies about an electrode considering all of the above-mentioned three aspects.

DISCLOSURE

Technical Problem

The present disclosure is designed to solve the problems of the related art, and therefore the present disclosure is directed to providing an electrode having a three-dimensional structure which satisfies all of the three aspects including minimization of additives in an electrode layer, use of a current collector made of a light material and an excellent electroconductive network.

The present disclosure is also directed to providing an electrochemical device including the electrode having a three-dimensional structure.

Technical Solution

In one aspect of the present disclosure, there is provided an electrode having a three-dimensional structure, the electrode including:

a porous nonwoven web including a plurality of polymer fibers that form an interconnected porous network;

an active material composite positioned among the polymer fibers and including active material particles and a first conductive material; and a second conductive material positioned on an outer surface of the active material composite, wherein the interconnected porous network is filled homogeneously with the active material composite and the second conductive material to form a super lattice structure.

The porous nonwoven web may be an assembly in which the polymer fibers are interconnected three-dimensionally and continuously, and in which the polymer fibers are arranged in random orientations and locations.

Meanwhile, the electrode having a three-dimensional structure may have a porosity of 5-95 vol %.

The electrode having a three-dimensional structure may include 5-50 parts by weight of the porous nonwoven web, 1-50 parts by weight of the first conductive material, and 0.1-20 parts by weight of the second conductive material, based on 100 parts by weight of the active material particles.

The polymer fibers may have an average diameter of 0.001-1000 µm.

The active material particles may have an average diameter of 0.001-30 µm.

The electrode having a three-dimensional structure may have a thickness of 1-1000 µm.

The electrode having a three-dimensional structure may have a weight per area of 0.001 mg/cm$^2$-1 g/cm$^2$.

An electrode assembly having electrodes each having a three-dimensional structure may have a multilayer structure in which a plurality of the electrodes are stacked.

Such a multi-layered electrode assembly having electrodes each having a three-dimensional structure may have a weight per area for each of the electrodes of 0.002 g/cm$^2$-10 g/cm$^2$.

A polymer forming the polymer fibers may be at least one selected from the group consisting of: polyethylene terephthalate, polyimide, polyamide, poly sulfone, polyvinylidene fluoride, polyacrylonitrile, polyethylene, polypropylene, polyetherimide, polyvinyl alcohol, polyethylene oxide, polyacrylate, polyvinyl pyrrolidone, agarose, alginate, polyvinylidene hexafluoropropylene, polyurethane, polypyrrole, poly(3,4-ethylenedioxythiophene), polyaniline, and derivatives thereof.

According to an embodiment of the present disclosure, the porous nonwoven web may further include at least one selected from the group consisting of carbon nanotubes, graphene, graphene oxide, reduced graphene oxide and carbon nanofibers.

A material forming the active material particle may be at least one selected from the group consisting of: carbonaceous materials, lithium metal oxides, silicon (Si), tin (Sn), germanium (Ge), sulfur (S), derivatives thereof, and combinations thereof, wherein the oxides may include at least one selected from the group consisting of: iron oxides, cobalt oxides, tin oxides, titanium oxides, nickel oxides, zinc oxides, manganese oxides, silicon oxides, vanadium oxides, copper oxides, and combinations thereof.

Each of the first conductive material and the second conductive material may be formed from at least one material independently selected from the group consisting of: carbon nanotubes, silver nanowires, nickel nanowires, gold nanowires, graphene, graphene oxide, reduced graphene oxide, polypyrrole, poly(3,4-ethylenedioxythiophene), polyaniline, derivatives thereof, and combinations thereof.

The electrode having a three-dimensional structure may have polarity.

The electrode having a three-dimensional structure may be any one selected from a positive electrode and a negative electrode.

In another aspect, there is provided an electrochemical device, including: a positive electrode; a negative electrode; a separator interposed between the positive electrode and the negative electrode; and an electrolyte injected into a space containing the positive electrode, the negative electrode, and the separator, wherein at least one of the positive electrode and the negative electrode is the above-defined electrode having a three-dimensional structure.

The electrochemical device may be any one selected from the group consisting of: a lithium secondary battery, super capacitor, lithium-sulfur battery, sodium ion battery, lithium-air battery, zinc-air battery, aluminum-air battery, and magnesium ion battery.

In still another aspect, there is provided a method for manufacturing an electrode having a three-dimensional structure, including the steps of:

combining an active material with a first conductive material to obtain an active material composite;

dissolving a polymer into a solvent to obtain a polymer solution;

dispersing the active material composite and a second conductive material into a dispersion medium to obtain a colloidal solution;

spinning the polymer solution and the colloidal solution at the same time to obtain fibers having a three-dimensional structure; and compressing the fibers having a three-dimensional structure.

The step of spinning the polymer solution and the colloidal solution at the same time to obtain fibers having a three-dimensional structure may include forming a nonwoven web including a plurality of polymer fibers, and filling the spaces between the polymer fibers homogeneously with the active material particles and the conductive materials while forming pores.

Formation of the composite of the active material particles with the first conductive material may be carried out by combining the active material particles with the first conductive material by using a pulverization device.

When forming the composite of the active material particles with the first conductive material, a dispersing agent may be added to produce a homogeneous composite.

The dispersing agent may be at least one selected from the group consisting of polyvinyl pyrrolidone, poly(3,4-ethylenedioxythiophene), polystyrene sulfonate, derivatives thereof and combinations thereof.

Particularly, the step of spinning the polymer solution and the colloidal solution at the same time to obtain fibers having a three-dimensional structure may be carried out by using any one method selected from the group consisting of dual electrospinning, dual electrospraying, dual spraying and combinations thereof.

The polymer solution and the colloidal solution may be spun at a spinning rate of 2-15 μL/min and 30-150 μL/min, respectively.

The polymer solution may include the polymer in an amount of 5-30 wt % based on the total weight of the polymer solution.

The solvent may be at least one selected from the group consisting of N,N-dimethylformamide, N,N-dimethyl acetamide, N-methyl pyrrolidone and combinations thereof.

The colloidal solution may include the active material particles in an amount of 1-50 wt % based on the total weight of the colloidal solution.

The colloidal solution may further include a dispersing agent, and the colloidal solution may include the dispersing agent in an amount of 0.001-10 wt % based on the total weight of the colloidal solution.

Particularly, the dispersing agent may be at least one selected from the group consisting of polyvinyl pyrrolidone, poly(3,4-ethylenedioxythiophene) and combinations thereof.

The dispersion medium may be any one selected from the group consisting of deionized water, isopropyl alcohol, butanol, ethanol, hexanol, acetone, N,N-dimethylformamide, N,N-dimethylacetamide, N-methyl pyrrolidone and combinations thereof.

Advantageous Effects

According to an embodiment of the present disclosure, it is possible to provide an electrode having a three-dimensional structure which uses a minimized amount of additives by virtue of a closely packed super lattice of the active material/conductive material composite, has improved capacity per unit weight or volume by virtue of the use of a current collector made of a light material, and contributes to the high output characteristics of an electrochemical device by forming a uniform electroconductive network.

According to another embodiment of the present disclosure, it is possible to provide an electrochemical device having excellent capacity per unit weight or volume, high energy density and high output characteristics.

BEST MODE

Hereinafter, preferred embodiments of the present disclosure will be described in detail. However, the following examples are for illustrative purposes only and not intended to limit the scope of this disclosure as defined in the claims described hereinafter.

Unless otherwise stated, the terminology (including technological and scientific terminology) used herein will be interpreted based on the meanings commonly understood by those skilled in the art. It will be understood that the terms "comprises" or "includes", when used in this specification, specify the presence of stated elements but do not preclude the presence or addition of one or more other elements. It will be further understood that the singular forms "a", "an" and "the" are intended to include the plural forms as well, unless the context clearly indicates otherwise.

Figure 2:
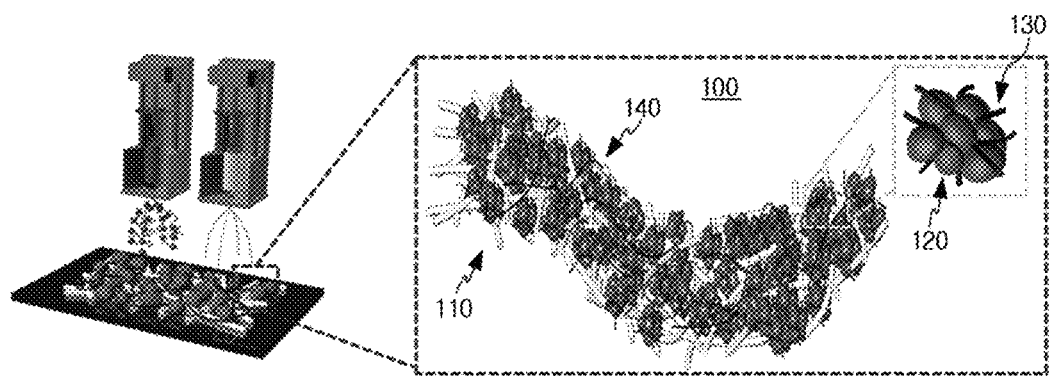
FIG. 2 is a schematic view illustrating the electrode having a three-dimensional structure according to an embodiment of the present disclosure and a method for manufacturing an electrode having a three-dimensional structure according to another embodiment of the present disclosure.

FIG. 2 is a schematic view illustrating the electrode having a three-dimensional structure according to an embodiment of the present disclosure and a method for manufacturing an electrode having a three-dimensional structure according to another embodiment of the present disclosure. Hereinafter, the present disclosure will be described with reference to FIG. 2. For reference, the same drawing numeral represents the same constitutional element throughout the specification.

In one aspect of the present disclosure, there is provided an electrode having a three-dimensional structure, which includes:

a porous nonwoven web including a plurality of polymer fibers;

an active material composite positioned among the polymer fibers and provided with active material particles and a first conductive material; and a second conductive material positioned on the outer surface of the active material composite, wherein an interconnected porous network is formed by the polymer fibers, and the interconnected porous network is filled homogeneously with the active material composite and the second conductive material to form a super lattice structure.

Referring to FIG. 2, the electrode having a three-dimensional structure shows a super lattice structure, wherein the polymer fibers 110 included in the porous nonwoven web function as a support, the spaces among the polymer fibers 110 are filled homogeneously with the active material composite including the active material particles 120 and the first conductive material 130, and the second conductive material 140, and the polymer fibers 110 form an interconnected porous network.

The electrode is obtained by considering all of the three aspects including minimization of additives, use of a current collector made of a light material and an excellent electroconductive network.

Particularly, the electrode includes no additional binder to minimize additives, and uses the porous nonwoven web as a light material instead of a metal current collector to improve the capacity per unit weight or volume of the electrode.

In addition, the active material composite including the active material particles and the first conductive material is surrounded with the second conductive material to form a uniform electroconductive network, thereby contributing to high output characteristics of an electrochemical device. In other words, as compared to the conventional electrode, rate discharge characteristics may be improved. Particularly, even when using active material particles having low electroconductivity, output characteristics may be maximized.

Hereinafter, the electrode having a three-dimensional structure according to an embodiment of the present disclosure will be described in more detail.

As described above, in the electrode having a three-dimensional structure, the polymer fibers 110 included in the porous nonwoven web form a three-dimensionally, randomly and continuously interconnected assembly, thereby forming a plurality of random spaces.

The formed spaces are filled homogeneously with the active material composite including the active material particles 120 and the first conductive material 130 and the second conductive material 140, and the polymer fibers 110 form an interconnected porous network.

Herein, the first conductive material forms a composite with the active material particles to form quasi-secondary particles, not simple active material nanoparticles. Thus, the composite shows a structure and performance different from those of a mixture obtained by simple mixing active material particles with a conductive material through a colloidal solution.

The active material composite is secondary particles containing the first conductive material and the active material particles, and the first conductive material may be located at the inside and the surface of the secondary particles. Thus, the first conductive material at the inside of the secondary particles may serve as a bonding agent for connecting and fixing the active material particles, and at the same time, the first conductive material located at the surface of the secondary particles may serve to connect to another first conductive material located at the surface of a neighboring active material composite and to the second conductive material.

As a result, the electrode having a three-dimensional structure according to an embodiment of the present disclosure forms an electroconductive network among the active material particles forming the active material composite by the first conductive material in the active material composite. Further, a homogeneous electroconductive network is also formed in the active material composite by the second conductive material formed on the outer surface of the active material composite.

Particularly, the electrode having a three-dimensional structure may have a porosity of 5-95 vol %. When the porosity is within the above-defined range, it is possible to absorb an electrolyte with ease and to control the ion transportability adequately, thereby contributing to improvement of the performance of an electrochemical device.

In addition, when the porosity satisfies the above-defined range, there is no problem of an excessively small loading level of electrode based on its volume, the distance between the active material particles and the conductive material is controlled adequately to form an electroconductive network satisfactorily, and the electrode having a three-dimensional structure can retain ion conductivity with ease.

More particularly, the electrode having a three-dimensional structure may have a porosity of 30-90 vol %. In this case, the electrode having a three-dimensional structure has more increased ion conductivity and improved mechanical strength.

Further, the porosity of the electrode having a three-dimensional structure may be controlled by the diameter or content of the active material particles, as described hereinafter.

Hereinafter, the content of each ingredient contained in the electrode having a three-dimensional structure will be described in detail.

The content of the porous nonwoven web in the electrode having a three-dimensional structure may be 5-50 parts by weight, particularly 10-40 parts by weight, and more particularly 15-30 parts by weight based on 100 parts by weight of the active material particles in the electrode having a three-dimensional structure. It is possible to increase the capacity per weight and capacity per volume of the electrode by using the porous nonwoven web in the above-defined range instead of a metal current collector.

When the content of the nonwoven web satisfies the above-defined range, the nonwoven porous web performs a function as a support sufficiently. Thus, it is possible to retain the structure of the electrode having a three-dimensional structure. In addition, since the active material particles and the conductive material are present in an adequate amount, it is possible to prevent degradation of the electroconductivity of the electrode.

In addition, when the content of the porous nonwoven web satisfies the above-defined range based on the content of the active material particles, it is possible to improve the capacity and energy density of an electrochemical device, and to contribute to providing the above-defined porosity of the electrode having a three-dimensional structure. This is because the active material particles are factors substantially contributing to realizing the capacity and energy density of an electrochemical device among the ingredients of the electrode having a three-dimensional structure, and the content of the active material particles in the electrode having a three-dimensional structure is one of the factors determining the porosity of the electrode having a three-dimensional structure.

The first conductive material forming the active material composite in combination with the active material particles may be present in an amount of 1-50 parts by weight, particularly 5-40 parts by weight, and more particularly 10-30 parts by weight, based on 100 parts by weight of the active material particles.

When the first conductive material satisfies the above-defined range, it is possible to form an electroconductive network with ease between the active material particles and the first conductive material, to improve the life characteristics and output characteristics of an electrode, and to retain the electroconductive network even when the active material undergoes volumetric swelling.

The second conductive material may be present in an amount of 0.1-20 parts by weight, particularly 1-15 parts by weight, and more particularly 5-10 parts by weight, based on 100 parts by weight of the active material particles. When the content of the second conductive material satisfies the above-defined range, it is possible for a spinning solution to retain its dispersion state stably during the manufacture of an electrode. It is also possible to retain the electroconductive network even when the electrode undergoes physical deformation. In this context, the second conductive material preferably has a larger aspect ratio as compared to the first conductive material with a view to improvement of the physical properties of an electrode.

When forming the porous nonwoven web and the electrode by using the active material composite including the active material particles and the first conductive material alone without using the second conductive material, it is not possible to impart conductivity among the active material composites merely by the first conductive material locked in the active material composite. Since the second conductive material is positioned in the spaces among the active material composites while being in contact with and making an interconnection with the outer surfaces of the active material composites, it is possible to form a uniform electroconductive network capable of imparting conductivity among the active material composites.

The second conductive material may be present in an amount of 0.2-2,000 parts by weight, particularly 2.5-300 parts by weight, and more particularly 10-100 parts by weight, based on 100 parts by weight of the first conductive particles. When the second conductive material satisfies the above-defined range, it is possible to maximize electron transport through uniform interconnection in an electroconductive network.

The polymer fibers may have an average diameter of 0.001-1000 µm, particularly 0.005-50 µm, and more particularly 0.01-5 µm. As the polymer fibers having an average diameter within the above-defined range form a three-dimensional assembly, it is possible to ensure a space to be filled with the active material particles and the conductive material with ease. It is also possible for an electrode to have a uniform porous structure to facilitate absorption of an electrolyte and ion transport in the electrode.

In addition, within the above-defined diameter range, the support formed by the polymer fibers may have an adequately controlled thickness. Thus, it is possible to ensure pores to be filled with the active material composite and the second conductive material. It is also possible to provide the support with properties sufficient for functioning as a support. Particularly, the polymer fibers may have an average diameter of 0.01-1 µm. In this case, the above-mentioned effects may be maximized.

The active material particles may have an average diameter of 0.001-30 µm, particularly 0.001-10 µm. The active material particles having an average diameter within the above-defined range contribute to controlling the porosity of the electrode having a three-dimensional structure to the above-defined range. In addition, in the method for manufacturing an electrode having a three-dimensional structure as described hereinafter, it is possible to improve the dispersity of the colloidal solution containing the active material particles and to minimize the problems generated during a dual electrospinning process. As a result, it is possible to form pores uniformly in the finished electrode having a three-dimensional structure.

In addition, when the average diameter of the active material particles satisfies the above-defined range, the spinning solution used for manufacturing the electrode retains its dispersion state and the particles can be handled with ease during processing.

The electrode having a three-dimensional structure may have a weight per unit area of 0.001 mg/cm$^2$-1 g/cm$^2$, particularly 0.01 mg/cm$^2$-0.1 g/cm$^2$, and more particularly 0.5 mg/cm$^2$-20 m g/cm$^2$. The weight per unit area of the electrode is improved by minimizing additives in the electrode having a three-dimensional structure and using the porous nonwoven web while avoiding the use of a metal current collector. As a result, it is possible to increase the energy density of the electrode and the capacity of an electrochemical device.

Meanwhile, when the electrode having a three-dimensional structure is formed as a single layer, its weight per unit area cannot be larger than 1 g/cm$^2$.

In addition, in the electrode having a three-dimensional structure, a plurality of electrodes may form a multilayer structure. In this manner, it is possible to maximize the loading of the electrode materials comprising the active material composite and the second conductive material in the electrode having a three-dimensional structure, and thus to improve the capacity and energy density of an electrochemical device.

Particularly, the multi-layered electrode having a three-dimensional structure may have a weight (of electrode materials) of unit area of 0.002 g/cm$^2$-10 g/cm$^2$, or 0.005 g/cm$^2$-10 g/cm$^2$, or 0.007 g/cm$^2$-10 g/cm$^2$.

Independently from the above, the electrode having a three-dimensional structure may have a thickness of 1-100 µm. Within the above-defined range, as the thickness of the electrode is increased, the energy density of the electrode may be increased.

In general, as the thickness of an electrode is increased, the electroconductivity of the electrode along the thickness direction is decreased to cause degradation of the output characteristics of a battery. However, in the case of the electrode having a three-dimensional structure, it maintains a good electroconductive network even in the thickness direction within the above-defined thickness range.

Hereinafter, each of the ingredients of the electrode having a three-dimensional structure will be described.

The polymer fibers are not particularly limited, as long as they can be assembled randomly to form the porous nonwoven web. However, when the polymer forming the polymer fibers is a heat resistant polymer, it is advantageous to ensure the heat stability of the electrode.

Particularly, the polymer forming the polymer fibers may be at least one selected from the group consisting of polyethylene terephthalate, polyimide, polyamide, polysulfone, polyvinylidene fluoride, polyacrylonitrile, polyethylene, polypropylene, polyetherimide, polyvinyl alcohol, polyethylene oxide, polyacrylate, polyvinyl pyrrolidone, agarose, alginate, polyvinylidene hexafluoropropylene, polyurethane, polypyrrole, poly (3,4-ethylenedioxythiophene), polyaniline and derivatives thereof.

According to an embodiment of the present disclosure, the porous nonwoven web may further include at least one selected from the group consisting of carbon nanotubes, graphene, graphene oxide, reduced graphene oxide and carbon nanofiber. In this case, it is possible to improve the strength and electroconductivity of the porous nonwoven web.

The active material particle may be at least one selected from the group consisting of the above-mentioned lithium metal oxides, oxides, silicon (Si), tin (Sn), germanium (Ge), sulfur (S) and derivatives and combinations thereof. Particularly, lithium metal oxides and derivatives thereof are known as positive electrode active materials, and thus the electrode using them may be a positive electrode. Meanwhile, oxides, silicon (Si), tin (Sn), germanium (Ge), sulfur (S) and derivatives thereof are known as negative electrode active materials, and thus an electrode using them may be a negative electrode.

In addition, the active material particles may be surface coated with a carbonaceous compound. Detailed description thereof will be omitted, since it is widely known to those skilled in the art.

The lithium metal oxide among the active material particles may be at least one selected from the group consisting of lithium nickel oxide, lithium cobalt oxide, lithium manganese oxide, lithium titanium oxide, lithium nickel manganese oxide, lithium nickel cobalt manganese oxide, lithium nickel cobalt aluminum oxide, lithium iron phosphate oxide, lithium vanadium phosphate oxide, lithium manganese phosphate oxide, lithium manganese silicate oxide, lithium iron silicate oxide and combinations thereof.

In other words, at least one composite oxide of lithium with a metal selected from cobalt, manganese and a combination thereof may be used. Particularly, a compound represented by any one of the following chemical formulae may be used.

$Li_aA_{1-b}R_bD_2$ (wherein $0.90 \leq a \leq 1.8$ and $0 \leq b \leq 0.5$); $Li_aE_{1-b}R_bO_{2-c}D_c$ (wherein $0.90 \leq a \leq 1.8$, $0 \leq b \leq 0.5$ and $0 \leq c \leq 0.05$); $LiE_{2-b}R_bO_{4-c}D_c$ (wherein $0 \leq b \leq 0.5$ and $0 \leq c \leq 0.05$); $Li_aNi_{1-b-c}Co_bR_cD_\alpha$(wherein $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$(wherein $0.90 \leq a \leq 1.8$, $0 \leq b \leq 0.5$, $0 \leq c \leq 0.05$ and $0 \leq \alpha \leq 2$); $Li_aNi_{1-b-c}Co_bRcO_{2-\alpha}Z_2$ (wherein $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cD_\alpha$(wherein $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_\alpha$(wherein $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_2$ (wherein $0.90 \leq a \leq 1.8$, $0 \leq b \leq 0.5$, $0 \leq c \leq 0.05$ and $0 \leq \alpha \leq 2$); $Li_aNi_bE_cG_dO_2$ (wherein $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnGbO_2$ (wherein $0.90 \leq a \leq 1.8$ and $0.001 \leq b \leq 0.1$); $Li_aMn_2GbO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$, $LiMnPO_4$, $LiCoPO_4$, $Li_3V_2(PO_4)_3$, $Li_4Ti_5O_{12}$, $LiMnSiO_4$, $LiFeSiO_4$.

In the above chemical formulae, A is Ni, Co, Mn or a combination thereof; R is Al, Ni, Co, Mn, Cr, Fe, Mg, Sr, V, a rare earth metal element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

In addition, the oxide among the active material particles may be at least one selected from the group consisting of iron oxides, cobalt oxides, tin oxides, titanium oxides, nickel oxides, zinc oxides, manganese oxides, silicon oxides, vanadium oxides, copper oxides and combinations thereof.

In other words, the oxide may be at least one selected from the group consisting of $Fe_xO_y$, $Co_xO_y$, $S_nO_y$, $TiO_y$, NiO, $Mn_xO_y$, $Si_xO_y$, $V_xO_y$, $Cu_xO_y$, and a combination thereof (wherein $0.90 \leq x \leq 2.2$ and $0.9 \leq y \leq 6$).

Particularly, over-lithiated oxide ($0.33Li_2MnO_3 \cdot 0.67LiNi_{0.18}Co_{0.17}Mn_{0.65}O_2$, OLO) is selected as active material particles in the following examples.

Meanwhile, the first conductive material and the second conductive material are not particularly limited, as long as it can form an electroconductive network, and the first conductive material and the second conductive material may use one-directional (1D) or two-directional (2D) carbon, metal, or conductive polymer composite.

For example, the first conductive material and the second conductive may be independently at least one selected from the group consisting of carbon nanotubes, silver nanowires, nickel nanowires, gold nanowires, graphene, graphene oxide, reduced graphene oxide, polypyrrole, poly(3,4-ethylenedioxythiophene), polyaniline, and derivatives and combinations thereof.

According to an embodiment of the present disclosure, the first conductive material and the second conductive may be independently selected from the group consisting of carbon nanotube, graphene, graphene oxide, reduced graphene oxide, and mixtures thereof. Also, according to an embodiment of the present disclosure, the first conductive material and the second conductive may further include silver nanowires, nickel nanowires, gold nanowires, polypyrrole, poly(3,4-ethylenedioxythiophene), polyaniline, derivatives thereof, or mixtures thereof, in addition to carbon nanotube, graphene, graphene oxide, reduced graphene oxide, or mixtures thereof.

The carbon nanotube may employ multi-walled carbon nanotube (MWCNT) or the like.

Hereinafter, the electrode having a three-dimensional structure will be explained in detail.

The electrode having a three-dimensional structure may have polarity. In this case, it is possible to realize excellent wettability with an electrolyte.

The electrode having a three-dimensional structure may be any one selected from a positive electrode and a negative electrode.

The electrode having a three-dimensional structure may be obtained by the method including the steps of: combining an active material with a first conductive material to obtain an active material composite; dissolving a polymer into a solvent to obtain a polymer solution; dispersing the active material composite and a second conductive material into a dispersion medium to obtain a colloidal solution; spinning the polymer solution and the colloidal solution at the same time to obtain fibers having a three-dimensional structure; and compressing the fibers having a three-dimensional structure.

Herein, the step of spinning the polymer solution and the colloidal solution at the same time to obtain fibers having a three-dimensional structure may include forming a nonwoven web including a plurality of polymer fibers, and filling the spaces between the polymer fibers homogeneously with the active material particles and the conductive materials while forming pores.

This is a method for manufacturing an electrode having a three-dimensional structure and the above-described excellent characteristics by spinning both of the polymer solution and the colloidal solution at the same time.

In the above-mentioned steps, the active material particle may be at least one selected from the group consisting of lithium metal oxides, oxides, silicon (Si), tin (Sn), germanium (Ge), sulfur (S) and derivatives and combinations thereof.

Particularly, the method is for manufacturing an electrode having a three-dimensional structure by spinning the colloidal solution containing the active material composite and the second conductive material simultaneously with the polymer solution so that an interconnected porous network may be formed by the polymer fibers functioning as a support and a three-dimensional closely packed super lattice may be formed by the active material composite including the active material particles and the second conductive material.

Hereinafter, the method for manufacturing an electrode having a three-dimensional structure will be explained in detail. The same description as described above will be omitted.

First, the polymer solution and the colloidal solution are spun at the same time to form fibers having a three-dimensional structure.

The polymer solution is obtained by dissolving a polymer in a solvent, and the content of the polymer in the polymer solution may be controlled to obtain a viscosity suitable for the particular type of the polymer. According to an embodiment of the present disclosure, the polymer may be used in an amount of 5-30 wt %, particularly 5-25 wt %, and more particularly 10-20 wt % based on the total weight of the polymer solution. Within the above-defined range, it is possible to form a plurality of polymer fibers through the spraying of the polymer solution, thereby forming the porous nonwoven web.

In addition, when the polymer content in the polymer solution satisfies the above-defined range, it is possible to inhibit solidification of the polymer solution at the end of a nozzle through which the polymer solution is spun, thereby facilitating spinning of the polymer solution. It is also possible to spin the polymer solution uniformly, thereby preventing the problem of bead formation.

The solvent is not particularly limited, as long as it can dissolve the polymer. For example, the solvent may be at least one selected from the group consisting of N,N-dimethyl formamide, N,N-dimethyl acetamide, N-methyl pyrrolidone and a combination thereof.

The spinning method is not particularly limited, as long as it can perform the spinning of the polymer solution and the colloidal solution at the same time. For example, the spinning method may be any one selected from the group consisting of dual electrospinning, dual electrospray, dual spray and a combination thereof.

Particularly, a dual electrospinning method may be used, since it is favorable to formation of the closely packed super lattice and uniform pores.

In addition, the spinning may be carried out for 50 minutes to 24 hours. Within the above-defined range of time, it is possible to form the electrode having a three-dimensional structure. Particularly, as the spinning time is increased, the loading level of the active material particles in the electrode having a three-dimensional structure may be improved.

The polymer solution and the colloidal solution may be spun at a rate of 2-15 μL/min and 30-150 μL/min, respectively. When the spinning rate of each solution satisfies the above-defined range, it is possible to form an electrode having a three-dimensional structure. Particularly, when the spinning rate of the colloidal solution is increased within the above-defined range, it is possible to improve the loading level of the active material particles in the electrode having a three-dimensional structure.

However, when the polymer solution spinning rate does not satisfy the above-defined range, the polymer solution cannot be spun homogeneously, thereby forming beads undesirably. In addition, when the colloidal solution spinning rate does not satisfy the above-defined range, the colloidal solution cannot be spun homogeneously but be dropped in the form of large droplets. Thus, it is required to define the spinning rate of each solution within the above-defined range.

In addition, when forming the active material composite by combining the active material particles with the first conductive material, a pulverization system may be used to combine the active material particles with the first conductive material. Particular examples of the pulverization system include a ball mill, etc.

When forming the composite of the active material particles with the first conductive material, a pulverization solvent and dispersing agent may be added to form homogeneous composites.

The dispersing agent may be at least one selected from the group consisting of polyvinylidene pyrrolidone, poly(3,4-ethylenedioxythiophene), polystyrene sulfonate and derivatives and combinations thereof.

Particular examples of the pulverization solvent include water (deionized water, etc.), alcohols, or the like.

Herein, the dispersing agent may be used in an amount of 0.01-20 parts by weight, particularly 0.1-10 parts by weight, and more particularly 0.25-5 parts by weight, based on 100 parts by weight of the active material particles.

Hereinafter, the step of dispersing the active material composite and a second conductive material into a dispersion medium to obtain a colloidal solution will be explained.

While the active material particles and the first conductive material are pulverized together, the active material composite is formed. In other words, the pulverization step includes: aggregating the active material particles and the first conductive material with each other to form the active material composite; and dispersing the formed active material composite and the second conductive material into the dispersion medium to obtain the colloidal solution.

This is intended to carry out homogeneous dispersion of the active material composite in the colloidal solution and is related with defining the average diameter of the active material composite particles. Particularly, when pulverizing the active material composite particles having an average diameter in a micrometer unit so that they may have an average diameter in a nanometer unit, the active material composite is dispersed homogeneously in the colloidal solution with ease.

In the colloidal solution, the active material composite and the second conductive material are used at a weight ratio of 100:50, particularly 100:30, and more particularly 100:15.

When the second conductive material is used in the above-defined range, it is possible to provide an electroconductive network in the electrode and to improve the output of an electrochemical device. The reason why the upper limit and the lower limit are defined is the same as described above.

The colloidal solution may further include a dispersing agent, and the dispersing agent may be used in an amount of 0.001-10 wt % based on the total weight of the colloidal solution.

When the dispersing agent is used within the above-defined range, it is possible to facilitate dispersion of the active material particles and the conductive material in the colloidal solution. It is also possible to prevent the problems of an excessive increase in viscosity of the colloidal solution caused by an excessive amount of dispersing agent and a failure in functioning as a dispersing agent caused by an excessively small amount of dispersing agent.

Particularly, the dispersing agent may be at least one selected from the group consisting of polyvinyl pyrrolidone, poly(3,4-diethylenedioxythiophene) and a combination thereof.

The dispersion medium is not particularly limited, as long as it is capable of dispersing the active material particles and the conductive material. Particular examples of the dispersion medium include any one selected from the group consisting of deionized water, isopropyl alcohol, butanol, ethanol, hexanol, acetone, N,N-dimethylformamide, N,N-dimethylacetamide, N-methyl pyrrolidone and combinations thereof.

In still another aspect, there is provided an electrochemical device including: a positive electrode; a negative electrode; a separator interposed between the positive electrode and the negative electrode; and an electrolyte injected to the positive electrode, negative electrode and the separator, wherein at least one of the positive electrode and the negative electrode is the electrode having a three-dimensional structure as defined above.

The electrochemical device has high capacity per unit weight or volume, high energy density and high output characteristics by using the above-described electrode having a three dimensional structure.

The electrochemical device may be any one selected from the group consisting of a lithium secondary battery, super capacitor, lithium-sulfur battery, sodium ion battery, lithium-air battery, zinc-air battery, aluminum-air battery and a magnesium ion battery.

Figure 3:
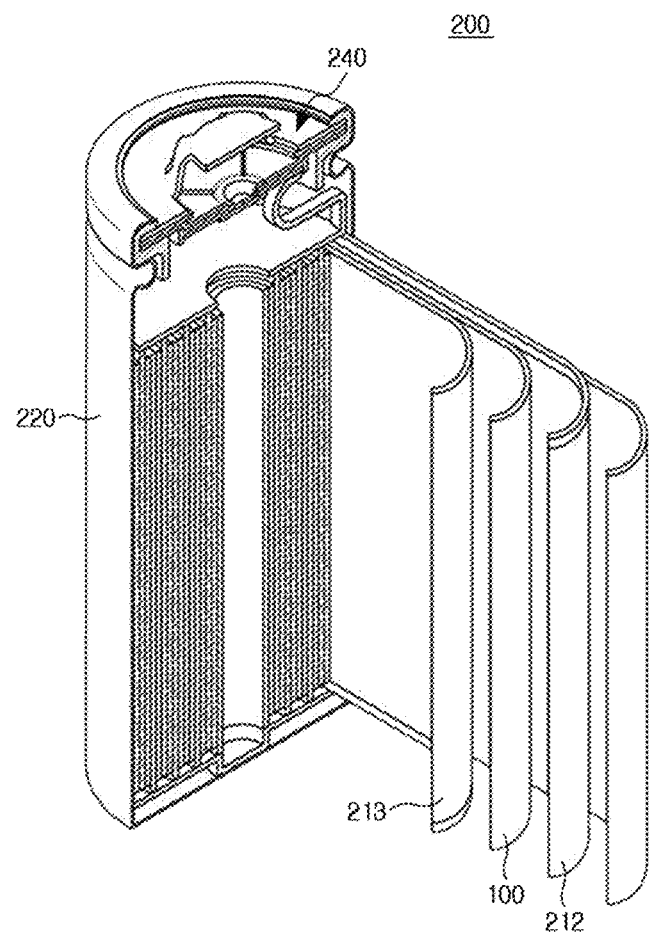
FIG. 3 is a schematic view illustrating a lithium secondary battery module including the electrode having a three-dimensional fibrous structure according to an embodiment of the present disclosure.

Particularly, the electrochemical device may be a lithium secondary battery, the embodiments of which will be described hereinafter. FIG. 3 is a schematic view illustrating the lithium secondary battery including the electrode having a three-dimensional fibrous structure according to an embodiment of the present disclosure.

Referring to FIG. 3, the lithium secondary battery 200 according to an embodiment of the present disclosure includes a positive electrode 212, a negative electrode 213, a separator 210 interposed between the positive electrode 212 and the negative electrode 213, and an electrolyte (not shown) injected to the positive electrode 212, negative electrode 213 and the separator 210. In addition to the above, a battery casing 220 and an enclosure member 240 for enclosing the battery casing 220 are used as main elements for forming a secondary battery module.

In general, the lithium secondary battery 200 may be obtained by interposing the separator 210 between the positive electrode 212 including a positive electrode active material and a negative electrode 213 including a negative electrode active material, introducing the positive electrode 212, negative electrode 213 and the separator 210 to the battery casing 220, injecting an electrolyte for a lithium secondary battery thereto, and sealing the battery casing 220 so that the pores of the separator 210 may be filled with the electrolyte for a lithium secondary battery. The battery casing 220 may have various shapes, such as cylindrical, prismatic, coin-like and pouch-like shapes. In the case of a cylindrical lithium secondary battery, the positive electrode 212, negative electrode 213 and the separator 210 are stacked successively and wound spirally, and then introduced to the battery casing 220 to provide a lithium secondary battery.

The structure of a lithium secondary battery and method for manufacturing a lithium secondary battery are widely known in the art, and thus detailed description thereof will be omitted to avoid unnecessarily obscuring the present disclosure.

In addition, particular examples of the electrolyte include a non-aqueous electrolyte containing a lithium salt dissolved in an organic solvent, polyelectrolyte, inorganic solid electrolyte, composite of polyelectrolyte/inorganic solid electrolyte, or the like.

In the non-aqueous electrolyte, the non-aqueous organic solvent functions as a medium through which ions participating in the electrochemical reactions of the battery can be transported. Particular examples of the non-aqueous organic solvent include carbonate, ester, ether, ketone, alcohol or aprotic solvents. The non-aqueous organic solvents may be used alone or in combination. When one or more non-aqueous organic solvents are used in combination, the mixing ratio may be controlled adequately depending on desired battery performance. This will be understood with ease by those skilled in the art.

The lithium salt dissolved in the non-aqueous organic solvent functions as a lithium ion source in the battery to allow basic operation as a lithium secondary battery and accelerates transport of lithium ions between the positive electrode and the negative electrode.

Typical examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein each of x and y is a natural number), LiCl, LiI, $LiB(C_2O_4)_2$ (lithium bis(oxalato) borate; LiBOB) or a combination thereof, and they are incorporated as supporting electrolyte salts. It is advisable to use the lithium salt at a concentration of 0.1-2.0M. Within the above-defined range, the electrolyte has adequate conductivity and viscosity to provide excellent electrolyte performance and facilitate transport of lithium ions effectively.

MODE FOR DISCLOSURE

The examples and experiments will now be described. The following examples and experiments are for illustrative purposes only and not intended to limit the scope of the present disclosure.

Manufacture of Electrode for Lithium Secondary Battery and Manufacture of Lithium Secondary Battery Including the Same

Example 1

Preparation of Polymer Solution

First, polyacrylonitrile (PAN) was used as a polymer for forming a polymer fiber and N,N-dimethyl formamide was used as a solvent for dissolving the polymer.

Polyacrylonitrile (PAN) was added to N,N-dimethyl formamide to provide a polymer solution containing 10 wt % of PAN.

Preparation of Active Material Composite of Active Material Particles/First Conductive Material As the active material particles, $0.33Li_2MnO_3 \cdot 0.67LiNi_{0.18}Co_{0.17}Mn_{0.65}O_2$, over-lithiated oxide (OLO) having an average diameter of 5 μm, was used. Multi-walled carbon nanotubes (MWCNT) were used as the first conductive material and deionized water was used as a pulverization solvent. Herein, 20 part by weight of the first conductive material was used to 100 parts by weight of the active material particles.

Herein, 1 part by weight of polyvinyl pyrrolidone was introduced as a dispersing agent to 100 parts by weight of the pulverization solvent, and pulverization was carried out by using a ball mill at 500 rpm for 1 hour to obtain an active material composite including $0.33Li_2MnO_3 \cdot 0.67LiNi_{0.18}Co_{0.17}Mn_{0.65}O_2$ combined homogeneously with MWCNT.

Preparation of Colloidal Solution

In addition, in order to obtain a colloidal solution including the active material composite of active material particles/first conductive material and a second conductive material, multi-walled carbon nanotubes (MWCNT) was used as the second conductive material, and deionized water was used as a dispersion medium and isopropyl alcohol was used as a co-solvent.

Particularly, the previously formed active material composite of $0.33Li_2MnO_3 \cdot 0.67LiNi_{0.18}Co_{0.17}Mn_{0.65}O_2$/MWCNT was added to and dispersed in deionized water and isopropyl alcohol (weight ratio of deionized water:isopropyl alcohol=3:7) to obtain an active material composite solution containing 5 wt % of the composite of $0.33Li_2MnO_3 \cdot 0.67LiNi_{0.18}Co_{0.17}Mn_{0.65}O_2$/MWCNT.

Then, the second conductive material was added to the active material composite solution in an amount of 10 wt % based on the weight of active material particles ($0.33Li_2MnO_3 \cdot 0.67LiNi_{0.18}Co_{0.17}Mn_{0.65}O_2$) to obtain a colloidal solution in which the active material composite and carbon nanotubes are dispersed together. Herein, polyvinyl pyrrolidone was added as a dispersing agent to the colloidal solution in an amount of 1 wt % based on the weight of the colloidal solution.

Manufacture of Electrode through Dual Electrospinning

The polymer solution and the colloidal solution were introduced to an electrospinning system (available from NanoNC), and were spun at the same time (dual electrospinning) for 240 minutes at a rate of 5 μL/min for the polymer solution and at a rate of 100 μL/min for the colloidal solution to obtain fibers having a three-dimensional structure, that is, a porous nonwoven web.

The resultant porous nonwoven web were compressed by using a roll press (available from KIPAE Ent.) and were subjected to a washing process using an aqueous solution for removing polyvinyl pyrrolidone solution as a dispersing agent. In this manner, an electrode having a three-dimensional structure was obtained, and the electrode had an electrode material (comprising the active material composite and the second conductive material) loading of about 7 mg/cm$^2$ and a thickness of about 30 μm.

Manufacture of Lithium Secondary Battery

The above electrode having a three-dimensional structure was used as a positive electrode to obtain a lithium secondary battery.

Particularly, lithium metal was used as a negative electrode and polyethylene (Tonen 20 μm) was used as a separator.

Then, LiPF$_6$ was dissolved in an organic solvent (ethylene carbonate (EC):diethyl carbonate (DEC)=1:1 (v/v)) to a concentration of 1M, thereby providing a non-aqueous electrolyte.

The obtained positive electrode, negative electrode and separator were used to form a coin-type cell, and the non-aqueous electrolyte was introduced thereto to obtain a coin-type lithium secondary battery.

Comparative Example 1

Manufacture of Electrode

First, 80 parts by weight of the active material composite (0.33Li$_2$MnO$_3$.0.67LiNi$_{0.18}$Co$_{0.17}$Mn$_{0.65}$O$_2$/MWCNT) prepared from Example 1, 10 parts by weight of carbon black as a conductive agent and 10 parts by weight of polyvinylidene fluoride (PVDF) as a binder polymer were added to 120 parts by weight of N-methyl-2-pyrrolidone (NMP) as a solvent to provide a positive electrode mixture slurry.

The positive electrode mixture slurry was coated on aluminum foil with a thickness of 20 μm as a positive electrode current collector, followed by drying, to obtain a positive electrode. Then, roll pressing was carried out to obtain an electrode having an electrode material (comprising the active material composite and the second conductive material) loading of about 7 mg/cm$^2$.

Manufacture of Lithium Secondary Battery

A lithium secondary battery was obtained in the same manner as Example 1, except that the above-mentioned electrode was used as a positive electrode.

Comparative Example 2

An electrode and a lithium secondary battery were obtained in the same manner as Example 1, except that active material particles were used alone instead of the active material composite of active material particles/first conductive material, when preparing a colloidal solution.

Comparative Example 3

An electrode and a lithium secondary battery were obtained in the same manner as Comparative Example 1, except that 0.33Li$_2$MnO$_3$.0.67LiNi$_{0.18}$Co$_{0.17}$Mn$_{0.65}$O$_2$ was used alone instead of the active material composite (0.33Li$_2$MnO$_3$.0.67LiNi$_{0.18}$Co$_{0.17}$Mn$_{0.65}$O$_2$/MWCNT) prepared from Example 1.

Evaluation of Electrode for Lithium Secondary Battery and Lithium Secondary Battery Including the Same Test Example 1

Observation of Active Material Composite of Active Material/First Conductive Material According to Example 1

Figure 1:
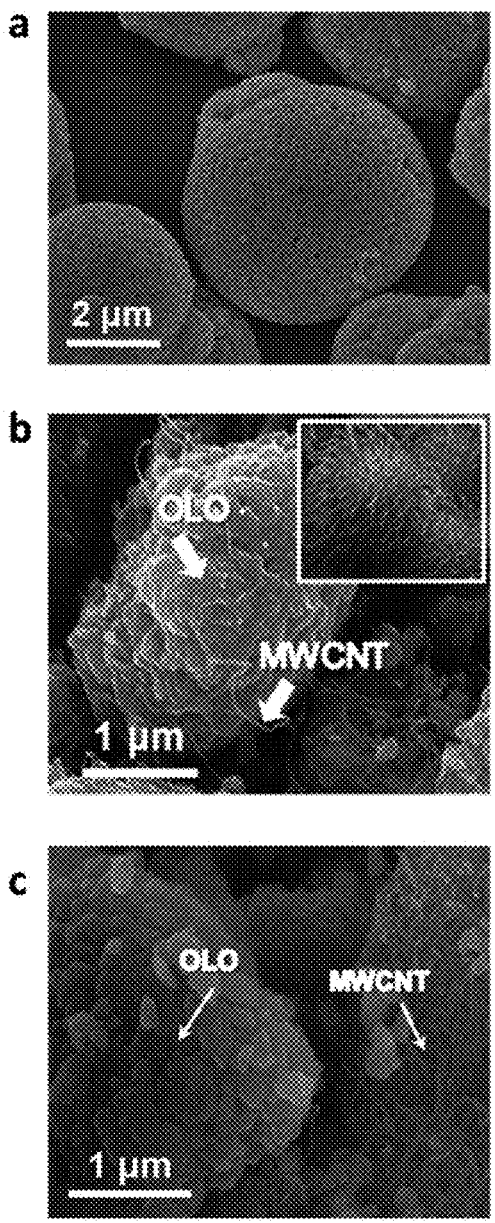
FIG. 1 is a scanning electron microscopic (SEM) image illustrating the active material composite including an active material and a first conductive material according to Example 1.

Scanning electron microscopy (SEM) was used to observe pure 0.33Li$_2$MnO$_3$.0.67LiNi$_{0.18}$Co$_{0.17}$Mn$_{0.65}$O$_2$ particles (FIG. 1a) and the 0.33Li$_2$MnO$_3$.0.67LiNi$_{0.18}$Co$_{0.17}$Mn$_{0.65}$O$_2$/MWCNT composite (FIG. 1b) and FIG. 1c). The 0.33Li$_2$MnO$_3$.0.67LiNi$_{0.18}$Co$_{0.17}$Mn$_{0.65}$O$_2$/MWCNT composite according to Example 1 was obtained by combining pure 0.33Li$_2$MnO$_3$.0.67LiNi$_{0.18}$Co$_{0.17}$Mn$_{0.65}$O$_2$ with 10 wt % of MWCNT, followed by pulverization. Herein, deionized water containing polyvinyl pyrrolidone added thereto was used as a pulverization solvent. Polyvinyl pyrrolidone functioned as a dispersing agent to form a homogeneous composite of 0.33Li$_2$MnO$_3$.0.67LiNi$_{0.18}$Co$_{0.17}$Mn$_{0.65}$O$_2$ particles with MWCNT (FIG. 1b). When the dispersing agent was not used, no composite was formed as shown in FIG. 1c.

Particularly, the pulverization was carried out by using a planetary mill available from Taemyong Scientific Co., LTD. for 30 minutes.

Test Example 2

Observation of Electrode According to Example 1

Scanning electron microscopy (SEM) was used to observe the section of the electrode according to Example 1. The results are shown in FIG. 4.

Figure 4:
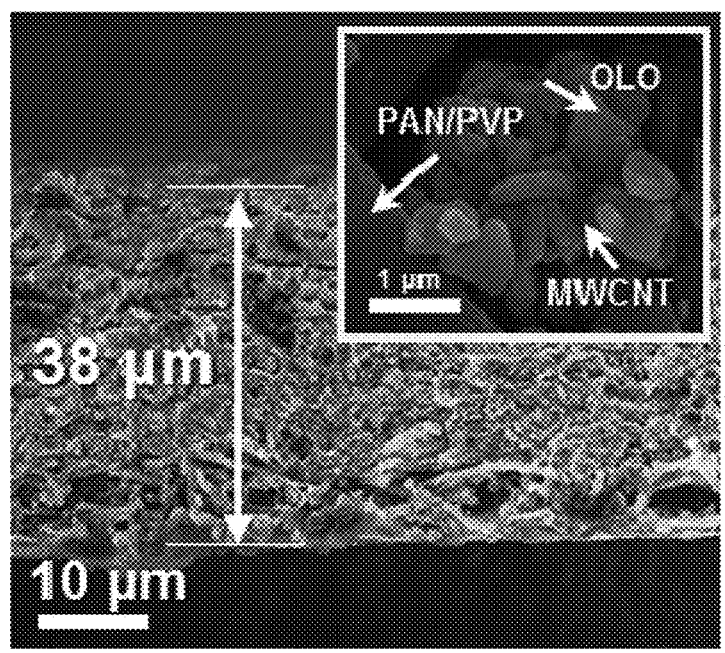
FIG. 4 is a scanning electron microscopic (SEM) image illustrating the section of the electrode according to Example 1 at a high magnification and at a low magnification.

As can be seen from FIG. 4, in the case of Example 1, big spaces present among a plurality of polymer fibers contained in the porous nonwoven web were filled perfectly with the active material particles (0.33Li$_2$MnO$_3$.0.67LiNi$_{0.18}$Co$_{0.17}$Mn$_{0.65}$O$_2$) and carbon nanotubes, the active material particles are surrounded with the carbon nanotubes, and a homogeneous electroconductive network is formed.

In addition, as can be seen from FIG. 4, the active material particles are combined homogeneously with carbon nanotubes also on the section of the electrode according to Example 1 to form an electroconductive network in the thickness direction of the electrode.

Figure 5:
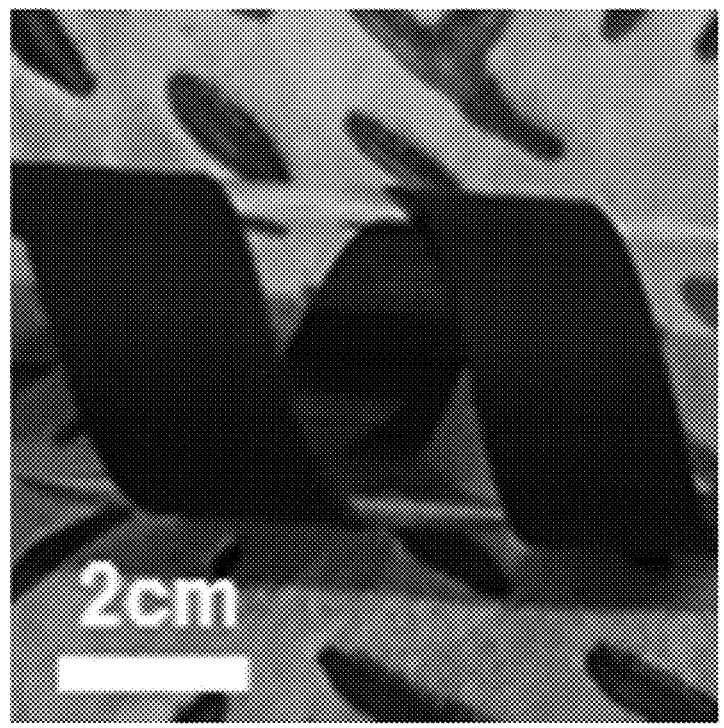
FIG. 5 is a photograph illustrating the appearance of the electrode according to Example 1.

Further, FIG. 5 shows the appearance of the electrode according to Example 1.

As can be seen from FIG. 5, the electrode maintains its structure well without separation of the active material particles, even when it is bent, despite the absence of a separate binder.

Test Example 3

Comparison of Surface Resistance of Electrodes

To compare the surface resistances of the electrodes according to Example 1, Comparative Example 1, Comparative Example 2 and Comparative Example 3 with each other, the electrodes were determined for electroconductivity.

Particularly, determination of electroconductivity was carried out by measuring the surface resistance with a 4-probe tip available from Dasol Eng. The results are shown in FIG. 6.

Figure 6:
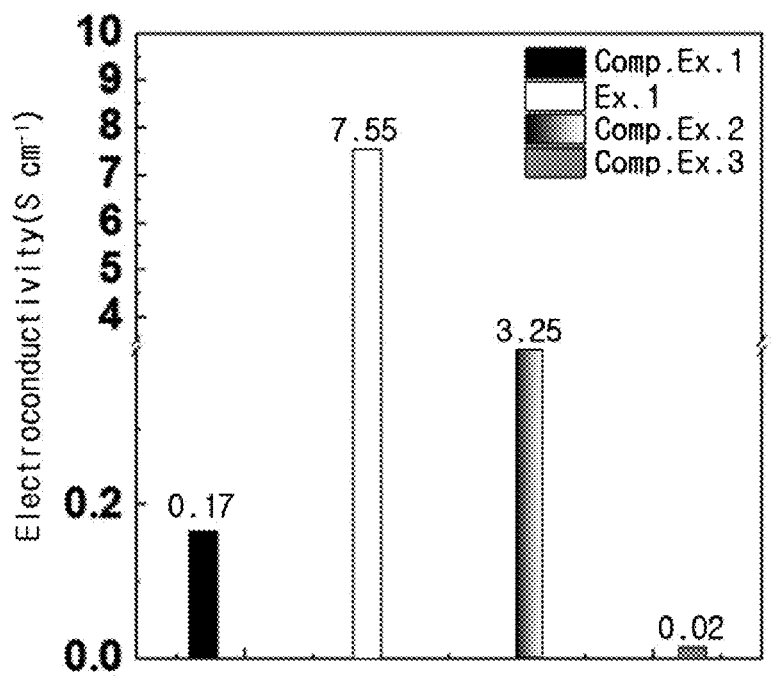
FIG. 6 is a graph illustrating the electroconductivity of the electrode having a three-dimensional structure according to Example 1 as compared with the electroconductivity of the electrode according to Comparative Example 1 and that of the electrode according to Comparative Example 2.

As can be seen from FIG. 6, as compared to Comparative Example 1 providing an electroconductivity of 0.17 S/cm, Example 1 shows an electroconductivity of 7.55 S/cm, which is about 44 times higher as compared to Comparative Example 1. Particularly, the electrode having a similar structure according to Comparative Example 2 shows an electroconductivity of 3.25 S/cm, which is lower as compared to Example 1. Meanwhile, as compared to Comparative Example 3, the electrode according to Comparative Example 1 shows improved electroconductivity. This demonstrates that once an electroconductive network is formed in the active material composite, electroconductivity is improved even in the case of a conventional electrode structure. Thus, it can be seen that the electrode according to Example 1 has an electroconductive network also in the active material composite by virtue of the first conductive material forming the active material composite with the active material, and thus shows high electroconductivity. It can be analogized that the electrode according to Example 1 can be used as an electrode without any additional current collector and the battery including the electrode according to Example 1 can provide improved output characteristics as compared to Comparative Examples 1 and 2.

Test Example 4

Comparison of Change in Resistance after Repeated Bending of Electrode

To carry out comparison of a change in resistance after repeated bending for each of the electrodes according to Example 1 and Comparative Example 1, electroconductivity was measured.

Figure 7:
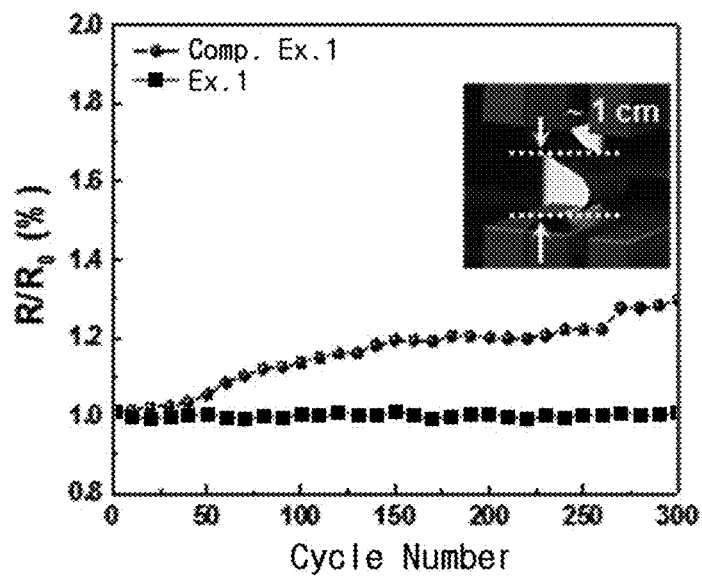
FIG. 7 is a graph illustrating a change in resistance of the electrode having a three-dimensional structure according to Example 1 as compared with that of the electrode according to Comparative Example 1, when each electrode is bent repeatedly.

Particularly, a change in resistance was measured by bending each electrode having a width of 1 cm and a length of 5 cm with a UTM device 300 times repeatedly at a rate of 20 mm/s so that the electrode may form a circle having a radius of 5 mm. The results are shown in FIG. 7. In FIG. 7, R is the resistance value when each electrode is bent, and $R_0$ is the resistance value when each electrode is not bent.

As can be seen from FIG. 7, the electrode according to Example 1 shows little change in resistance but the electrode according to Comparative Example 1 shows a gradual increase in resistance change. This suggests that the homogeneous electroconductive network of Example 1 is maintained even when the electrode is bent, and thus the electrode shows excellent performance along with flexibility.

Test Example 5

Comparison of Battery Performance

To determine the performance of each of the batteries according to Example 1 and Comparative Examples 1-3, the discharge capacity of each battery was observed while increasing the coin cell discharge current rate from 0.2 C to 5 C.

Figure 8:
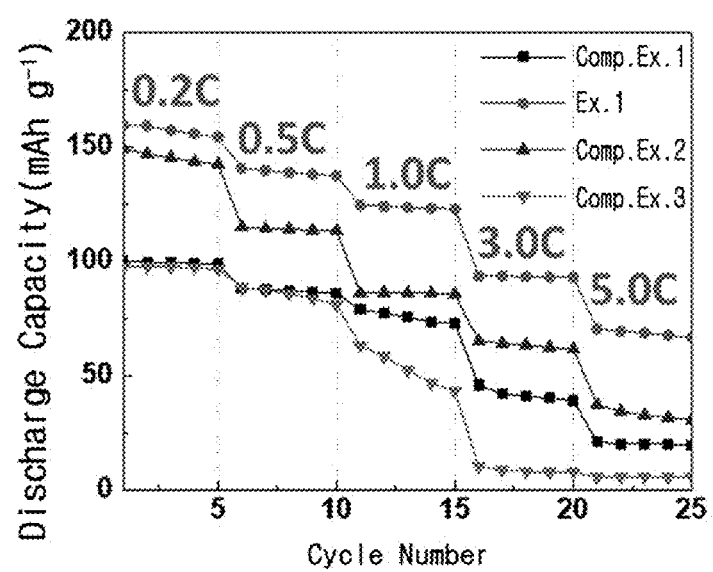
FIG. 8 is a graph illustrating the discharge capacity per weight of active materials as a function of discharge rate for each of the lithium secondary batteries according to Example 1 and Comparative Examples 1 and 2.

FIG. 8 shows the results of discharge capacity per weight of each electrode for the lithium secondary batteries according to Example 1 and Comparative Examples 1-3. As can be seen from FIG. 8, the lithium secondary battery according to Example 1 shows higher discharge capacity as the discharge current rate is increased, when compared to the lithium secondary batteries according to Comparative Examples 1 and 2. This is because carbon black does not form an electroconductive network sufficiently and homogeneously in Comparative Example 1, and polyvinylidene fluoride used as a binder polymer interrupts the electroconductive network.

Meanwhile, the lithium secondary battery according to Comparative Example 1 shows higher discharge capacity as compared to the lithium secondary battery according to Comparative Example 3. It can be seen from the above results that the electroconductive network formed by the composite of active material particles with the first conductive material can improve rate discharge characteristics even in a conventional electrode structure.

On the contrary, the electrode according to Example 1 uses no binder polymer unlike the electrode according to Comparative Example 1 and has a homogeneous electroconductive network formed by carbon nanotubes, and thus shows better performance as compared to Comparative Example 1 during the operation of the lithium secondary battery. In addition, unlike Comparative Example 1 using a metal current collector, Example 1 using nonwoven web fibers alone as a support and containing carbon nanotubes alone for forming the electroconductive network shows significantly increased discharge capacity per weight by virtue of a decrease in additives. Additionally, as compared to Comparative Example 2 having a similar electrode structure, the battery according to Example 1 shows more improved performance by virtue of the composite of the active material with the first conductive material. This suggests that the lithium secondary battery shows a lower weight as compared to Comparative Example 1, while providing higher output, higher capacity and higher energy density.

It will be understood that the present disclosure is not construed as being limited to the above-described embodiments but may be realized in various forms, and various changes and modifications within the scope of the disclosure will become apparent to those skilled in the art from this detailed description. Thus, it should be understood that the above-described embodiments are non-limiting and are given by way of illustration only.

| Description of Drawing Numerals |
| --- |
| 100: Electrode having three-dimensional structure |
| 110: Polymer fibers |
| 120: Active material particles |
| 130: First conductive material |
| 140: Second conductive material |
| 140: Enclosure member |
| 200: Lithium secondary battery |
| 210: Separator |
| 212: Positive electrode |
| 213: Negative Electrode |
| 220: Battery casing |

What is claimed is:

1. An electrode having a three-dimensional structure, the electrode comprising:
    a porous nonwoven web including a plurality of polymer fibers that form an interconnected porous network;
    an active material composite positioned among the polymer fibers and including active material particles and a first conductive material, the active material composite being secondary particles containing the active material particles and the first conductive material; and
    a second conductive material positioned on an outer surface of the active material composite,
    wherein the interconnected porous network is filled homogeneously with the active material composite and the second conductive material to form a three-dimensional super lattice structure,
    wherein the active material composite including the active material particles and the first conductive material is surrounded by the second conductive material.

2. The electrode according to claim 1, wherein the porous nonwoven web is an assembly in which the polymer fibers are interconnected three-dimensionally and continuously, and in which the polymer fibers are arranged in random orientations and locations.

3. The electrode according to claim 1, wherein the electrode has a porosity of 5-95 vol %.

4. The electrode according to claim 1, wherein the electrode comprises 5-50 parts by weight of the porous nonwoven web, 1-50 parts by weight of the first conductive material, and 0.1-20 parts by weight of the second conductive material, based on 100 parts by weight of the active material particles.

5. The electrode according to claim 1, wherein the polymer fibers have an average diameter of 0.001-1000 μm.

6. The electrode according to claim 1, wherein the active material particles have an average diameter of 0.001-30 μm.

7. The electrode according to claim 1, wherein the electrode has a thickness of 1-1000 μm.

8. The electrode according to claim 1, wherein an electrode material comprising the active material composite and the second conductive material has a weight per area of 0.001 mg/cm$^2$-1 g/cm$^2$.

9. The electrode according to claim 1, wherein a polymer forming the polymer fibers may be at least one selected from the group consisting of: polyethylene terephthalate, polyimide, polyamide, polysulfone, polyvinylidene fluoride, polyacrylonitrile, polyethylene, polypropylene, polyetherimide, polyvinyl alcohol, polyethylene oxide, polyacrylate, polyvinyl pyrrolidone, agarose, alginate, polyvinylidene hexafluoropropylene, polyurethane, polypyrrole, poly(3,4-ethylenedioxythiophene), polyaniline, and derivatives thereof.

10. The electrode according to claim 1, wherein a material forming the active material particle is at least one selected from the group consisting of: carbonaceous materials, lithium metal oxides, silicon (Si), tin (Sn), germanium (Ge), sulfur (S), derivatives thereof, and combinations thereof, and
the lithium metal oxides include at least one selected from the group consisting of: iron oxides, cobalt oxides, tin oxides, titanium oxides, nickel oxides, zinc oxides, manganese oxides, silicon oxides, vanadium oxides, copper oxides, and combinations thereof.

11. The electrode according to claim 1, wherein each of the first conductive material and the second conductive material is formed from at least one material independently selected from the group consisting of: carbon nanotubes, silver nanowires, nickel nanowires, gold nanowires, graphene, graphene oxide, reduced graphene oxide, polypyrrole, poly(3,4-ethylenedioxythiophene), polyaniline, derivatives thereof, and combinations thereof.

12. The electrode according to claim 1, wherein the electrode is a positive electrode.

13. The electrode according to claim 1, wherein the electrode is a negative electrode.

14. The electrode according to claim 1, wherein the first conductive material is located at the inside and the surface of the secondary particles, and
wherein the first conductive material located at the inside of the secondary particles is present between the active material particles forming the active material composite, wherein the first conductive material at the inside of the secondary particles serves as a bonding agent for connecting and fixing the active material particles, and at the same time, the first conductive material located at the surface of the secondary particles serves to connect to another first conductive material located at the surface of a neighboring active material composite and to the second conductive material.

15. An electrode assembly in which a plurality of electrodes are stacked, each of the electrodes according to claim 1.

16. The electrode assembly according to claim 15, wherein an electrode material comprising the active material composite and the second conductive material of each of the electrodes has a weight per area of 0.002 g/cm$^2$-10 g/cm$^2$.

17. An electrochemical device, comprising: a positive electrode; a negative electrode; a separator interposed between the positive electrode and the negative electrode; and an electrolyte injected into a space containing the positive electrode, the negative electrode, and the separator, wherein at least one of the positive electrode and the negative electrode is the electrode according to claim 1.

18. The electrochemical device according to claim 17, wherein the electrochemical device is any one selected from the group consisting of: a lithium secondary battery, super capacitor, lithium-sulfur battery, sodium ion battery, lithium-air battery, zinc-air battery, aluminum-air battery, and magnesium ion battery.

19. A method for manufacturing an electrode having a three-dimensional structure, the method comprising:
combining an active material with a first conductive material to obtain an active material composite, the active material composite being secondary particles containing the active material particles and the first conductive material;
dissolving a polymer into a solvent to obtain a polymer solution;
dispersing the active material composite and a second conductive material into a dispersion medium to obtain a colloidal solution;
spinning the polymer solution and the colloidal solution at the same time to obtain fibers having a three-dimensional structure; and
compressing the fibers having the three-dimensional structure,
wherein the active material composite including the active material particles and the first conductive material is surrounded by the second conductive material.

20. The method according to claim 19, wherein the spinning of the polymer solution and the colloidal solution at the same time includes forming a nonwoven web including a plurality of polymer fibers, and filling spaces between the polymer fibers homogeneously with particles of the active material composite and particles of the first and second conductive materials while forming pores.

21. The method according to claim 19, wherein the combining of the active material with the first conductive material to obtain the active material composite is performed by combining particles of the active material with the first conductive material using a pulverization device.

22. The method according to claim 19, wherein the first conductive material is located at the inside and the surface of the secondary particles, and
wherein the first conductive material located at the inside of the secondary particles is present between the active material particles forming the active material composite, wherein the first conductive material at the inside of the secondary particles serves as a bonding agent for connecting and fixing the active material particles, and at the same time, the first conductive material located at the surface of the secondary particles serves to connect to another first conductive material located at the surface of a neighboring active material composite and to the second conductive material.

\* \* \* \* \*